Patented Oct. 31, 1950

2,528,360

UNITED STATES PATENT OFFICE 2,528,360

EPOXIDE RESIN COMPOSITIONS

Sylvan Owen Greenlee, Louisville, Ky., assignor to Devoe & Raynolds Company, Inc., Louisville, Ky., a corporation of New York No Drawing. Application April 10, 1946,
Serial No. 661,060

21 Claims. (Cl. 260—45.2)

This invention relates to new products and compositions resulting from the reaction of complex epoxides with condensates of aldehydes and ammonia derivatives (amines and amides) in regulated proportions to give valuable compositions which are useful in the manufacture of varnishes, molding compositions, adhesives, films, fibers, molded articles, etc. The complex epoxides used in making the new compositions are those derived from the reaction of polyhydric phenols with polyfunctional halohydrins and alkali or with polyepoxides in regulated proportions. The invention includes initial reaction mixtures or compositions containing the complex epoxides and aldehyde amine or aldehyde amide condensates or mixtures thereof as well as intermediate and final reaction products or compositions and methods for their production and articles and products made therefrom.

The invention includes as primary and important embodiments thereof reaction mixtures and reaction products of the complex epoxides with urea aldehyde condensates or resins and with melamine aldehyde condensates or resins and mixtures thereof.

According to the present invention condensates of aldehydes with ammonia derivatives (amines and amides) in the form of initial or intermediate reaction products are admixed with complex epoxides or are reacted with such epoxides to form new compositions suitable for reaction or further reaction to form new complex reaction products.

One of the objects of the invention is the production of initial reaction mixtures or compositions containing condensates of aldehydes and ammonia derivatives and particularly urea aldehyde condensates or melamine aldehyde condensates or mixtures thereof with complex epoxides in proportions suitable for reaction by direct addition to form resins, films, molding compositions, etc.

Another object of the invention is the production of initial reaction mixtures or compositions containing such aldehyde condensates, and particularly urea aldehyde or melamine aldehyde condensates or mixtures thereof, with polyhydric phenols and polyepoxides in proportions suitable for reaction to form resins, films, molding compositions, etc.

Another object of the invention is the production of intermediate reaction products of such condensates and complex epoxides which are capable of further reaction to form insoluble, infusible products and the preparation of higher molecular weight and more complex compositions from such intermediate reaction products.

Another object of the invention is the production of films, articles, molded products and other final reaction products of outstanding properties from such condensates and complex epoxides.

Other objects of the invention will appear from the following more detailed description.

The aldehyde-ammonia derivative condensates which are used for reacting with the complex epoxides according to the present invention are condensates formed by the reaction of aldehydes and particularly formaldehyde with ammonia derivatives, including amines and amides, and more particularly with ureas and melamine to form, e. g., urea aldehyde condensates or melamine aldehyde condensates. It is known that various amines and amides will condense with aldehyde to form aldehyde-amine and aldehyde-amide condensates. Thus urea, thiourea and various substituted ureas and urea derivatives will react with aldehydes such as formaldehyde to form condensates, e. g., methylol ureas, etc. Similarly, it is well known that melamine will react with aldehydes and particularly formaldehyde to form melamine-aldehyde condensates. Various other amines and amides can similarly be reacted with formaldehyde, etc. to form condensates which are amine aldehyde or amide aldehyde resins or condensates. Thus, other amino triazines and amino diazines will similarly react with aldehydes to form condensates.

The aldehyde condensates with ammonia derivatives (amines and amides) used with the polyepoxides in making the new compositions of the present invention are in general partial and intermediate reaction or condensation products of aldehydes, particularly formaldehyde, with amines or amides or mixtures thereof.

In general, fusible urea aldehyde condensates of different degrees of condensation may be used with the epoxides to form the new compositions and reaction products. Thus, urea aldehyde condensates may be made by various processes known in the art for the manufacture of urea formaldehyde resins. The urea aldehyde condensates may thus be a water soluble type, and alcohol soluble type or an oil soluble type.

The urea aldehyde condensate may be one derived from the normal urea (carbamide) or it may be one derived from thiourea (thiocarbamide). Likewise, the condensate may be one derived from a substituted urea or a non-substituted urea. Some of the substituted ureas or thioureas such as those substituted with a long chain alkyl group give products which are more highly soluble in oil and hydrocarbon type compositions than are the usual non-substituted products and such products are useful in making the new compositions of the present invention.

A urea aldehyde condensate which is essentially an alkylol or polyalkylol urea and is not a polymer may be used in the preparation of the new compositions and reaction products, or the urea aldehyde condensate may be used as a highly condensed product so long as it is still fusible and is soluble in or blendable with the epoxide composition with which it is to be reacted.

Similarly the melamine aldehyde condensate may be one derived from melamine and an aldehyde or it may be derived from a melamine of somewhat modified structure. For example, the melamine used in preparing the melamine aldehyde condensate may have part of its hydrogen replaced by long alkyl chains and such condensates are useful in making the new compositions of the present invention.

In general, melamine aldehyde condensates of different states of condensation, so long as they are fusible, may be used with the epoxides to form the new compositions and reaction products. For example, the melamine aldehyde product may be a non-polymeric alkylol or polyalkylol melamine or it may be a highly condensed product in which case a number of molecules of melamine have been combined with each other through condensation of the alkylol groups.

Aldehyde condensates derived from amines closely related to melamine in structure, that is, of the triazine and diazine types, may be used in reactions with the epoxides according to the present invention.

Many of the commercial products derived from the reaction of urea or melamine with formaldehyde are mixed products made by reacting the formaldehyde with mixtures of urea and melamine. Such composite or mixed reaction products can advantageously be used for reaction with the epoxides according to the present invention.

Many of the present day commercial resins prepared by the reaction of urea or melamine or both with aldehydes are prepared in the presence of alcoholic or other solvents which actually take part in the reaction and become an integral part of the resulting resin composition. This is illustrated by the products prepared in the presence of butyl alcohol in which case the butyl alcohol to some extent condenses with the alkylol groups of the aldehyde condensate to give butyl ether residues as a part of the final composition. Such modified products are advantageously used in reactions with the epoxide to give the new compositions of the present invention.

The condensates of aldehydes with ammonia derivatives (amines and amides) are in general resinous in character but in the early stages of the condensation may be water soluble. Various aldehydes may be used in making such condensates but formaldehyde is particularly advantageous, and is the aldehyde commonly used in making aldehyde amine and aldehyde amide condensates. Various ammonia derivatives (amines and amides) can be used for reaction with the aldehydes to form the condensates. It is known that various amines will condense with aldehyde to form amine aldehyde resins. Thus, melamine will readily condense with formaldehyde to form melamine aldehyde condensates or resins. Other amino diazines and amino triazines can be similarly used. Various amides can similarly be condensed with aldehydes to form aldehyde-amide condensates. Urea formaldehyde condensates are formed by the condensation of formaldehyde with urea, substituted ureas, thioureas and substituted thioureas.

The complex epoxides used in making the new compositions are produced by the reaction of polyhydric phenols with polyfunctional halohydrins and alkali or with polyepoxides to form complex reaction products containing terminal epoxide groups. The production of such complex epoxides is described in my companion applications, Serial Nos. 617,176 filed September 18, 1945, 621,856 filed October 11, 1945 and 626,449 filed November 2, 1945.

In my companion application, Serial No. 626,449 filed November 2, 1945, I have described new polyepoxy products and compositions obtained by the direct addition of polyhydric phenols with polyepoxides and with the proportion of polyepoxides reacting with the polyhydric phenols in excess of the equivalent amount so that the resulting reaction products will contain terminal epoxy groups. Such polyepoxy reaction products and particularly complex polymeric polyepoxy reaction products are advantageously used in reaction with urea aldehyde condensates or melamine aldehyde condensates or mixtures thereof or other aldehyde amine or amide condensates to give the new compositions and products of the present invention.

In my companion application, Serial No. 653,156 filed March 8, 1946 now U. S. Patent No. 2,521,912, I have described complex epoxide containing compositions obtained by the reaction of phenol aldehyde condensates with polyepoxides to give compositions which contain unreacted epoxide groups. Such epoxide compositions are also advantageously used in reaction with urea aldehyde condensates or melamine aldehyde condensates or mixtures thereof or other aldehyde amine or amide condensates to give the new compositions and products of the present invention.

In my companion application, Serial No. 617,176 filed September 18, 1945, I have described complex polymeric reaction products of polyhydric phenols with polyfunctional halohydrins such as epichlorohydrin and glycerol dichlorohydrin, with the difunctional chlorohydrin used in proportions in excess of that equivalent to the polyhydric phenol and less than twice the equivalent amount, by carrying out the reaction with the addition of caustic alkali equal to or somewhat in excess of the amount required to combine with the halogen of the halohydrin to give complex polymeric products containing terminal epoxy groups and terminal hydroxyl groups and with the epoxy groups in general considerably in excess of the terminal primary hydroxyl groups. Such complex polymeric epoxy-hydroxy products and compositions are advantageously used for reaction with urea aldehyde condensates or melamine aldehyde condensates or mixtures thereof or other aldehyde amine or amide condensates give the new compositions and products of the present invention.

In my companion application, Serial No. 621,856, filed October 11, 1945, I have described the epoxy-hydroxy compositions resulting from the reaction of a polyhydric phenol with a polyfunctional halohydrin such as epichlorohydrin in approximate proportions of 2 mols of epichlorohydrin to 1 mol of dihydric phenol to give resinous products containing both terminal epoxy and hydroxy groups with the proportion of terminal epoxy groups considerably in excess of the terminal hydroxy groups. Such epoxyhydroxy compositions are also advantageously used in reaction with urea aldehyde condensates or melamine aldehyde condensates or mixtures thereof or other aldehyde amine or amide condensates to give the new compositions and products of the present invention.

Complex epoxide containing compositions can also be produced by the reaction of complex polyhydric phenols with polyfunctional halohydrins such as epichlorohydrin and glycerol dichlorohydrin, with the difunctional chlorohydrin used in proportions in excess of that equivalent to the polyhydric phenol; the polyhydric phenol being a complex polyhydric phenol derived from the reaction of a simple polyhydric phenol such as resorcinol, hydroquinone, and bisphenol (p,p'-dihydroxy-diphenyl dimethyl methane) with polyhalides which contribute no hydroxyl groups to the resulting composition, using the polyhydric phenol in proportions in excess of that equivalent to react with all of the halogen groups present in the polyhalide. Such complex epoxyhydroxy products and compositions are also advantageously used in reaction with urea aldehyde condensates or melamine aldehyde condensates or mixtures thereof or other aldehyde amine or amide condensates to form the new compositions and products of the present invention.

The complex epoxides used with the condensates of aldehydes and ammonia derivatives contain epoxide groups or epoxide and hydroxyl groups as their functional groups and are free from other functional groups such as basic and acid groups.

It is generally known that urea aldehyde condensates and melamine aldehyde condensates are formed by the direct addition of the aldehyde to the amine or amide group to form intermediate alkylol groups or compounds. Such products may then be further condensed to form polymers by the application of heat and in some cases without the application of heat in the presence of certain catalysts. Even in condensed products of an advanced stage of condensation there may be alkylol groups present which have not entered into the condensation reaction. There is also present in these compositions an appreciable percentage of hydrogen atoms directly attached to nitrogen atoms present in the amine or amide groups. Epoxide groups of the epoxides can react under proper conditions with such compounds containing hydrogen atoms which are directly attached to oxygen or nitrogen.

It is also generally known that urea aldehyde condensates and melamine aldehyde condensates condense to form infusible products which are lacking in flexibility to such an extent that they may be unsuitable for the formation of protective coatings, impregnation of porous materials, or for molding objects unless they are highly plasticized to make them suitable for such usage.

I have found that aldehyde amine and aldehyde amide condensates, such as urea aldehyde condensates and melamine aldehyde condensates or mixtures thereof or other aldehyde amine or amide condensates which would normally give brittle conversion products and would require a high percentage of plasticizer to give products with suitable flexibility for many uses, can be reacted with complex epoxides according to the present invention to give products which are usually tough, hard and flexible provided the proper reaction proportions are used. In fact these aldehyde condensates, when reacted with the complex epoxides in the proper proportions, may give reaction products which have suitable flexibility for protective coating films without the use of any plasticizer.

While the urea aldehyde condensates or the melamine aldehyde condensates or mixtures thereof or other aldehyde amine or amide condensates may be at different stages of conversion when used for compounding with the complex epoxides, compositions of somewhat different characters can be obtained with products of different stages of conversion. Thus, in some cases it is desirable to have a composition which is completely soluble in a common solvent or mixture of solvents; and in that case it is advantageous to use a urea aldehyde condensate or a melamine aldehyde condensate which is soluble in solvents in which the complex epoxides are also soluble. By using such complex epoxides with soluble condensates in a common solvent, solutions can be prepared and applied and the solvent subsequently evaporated before the main reaction between the epoxide and the condensate takes place. Compositions can thus be made which are solutions of the condensate and epoxide which can be used to impregnate porous materials, etc. and the reactants subsequently caused to react after removal of the solvent and heating to a higher temperature.

For other purposes it is desirable to use a powdered solid resin together with a liquid reactant and in such cases the aldehyde condensate may be a finely divided solid material and the complex epoxide used in a liquid form. For other applications very viscous compositions are desired and in this case one or more ingredients of the reaction mixture would be polymerized or reacted so as to obtain the desired viscosity.

In making the new compositions the aldehyde condensate and the complex epoxide are compounded in reacting proportions either without or with the addition of a catalyst and the reaction will in general be carried out with the application of heat.

The reactions which take place between the complex epoxide and the aldehyde condensates appear to be complex in nature. While I do not desire to limit myself by any theoretical explanation of the exact nature or mechanism of the reaction it seems probable that the reaction is in part one between an epoxide group of the complex epoxide with active hydrogen atoms directly attached to oxygen or to nitrogen in the aldehyde condensates. Since it is known that urea aldehyde condensates and melamine aldehyde condensates convert upon the application of heat to infusible products through the condensation of alkylol groups with each other or with active hydrogen directly attached to nitrogen it seems likely that the final conversion of the compositions containing the complex epoxides and aldehyde condensates includes a number of reactions among them the normal condensation reactions of the urea aldehyde condensates or of the melamine aldehyde condensates and the reaction of epoxide groups of the complex epoxides by direct addition to hydroxyl groups or to amine or amide groups of the condensates; while reaction may also take place between epoxide groups with hydroxyl groups present in the complex epoxides or liberated in the course of the reaction of epoxide groups with other active hydrogen atoms; and direct polymerization may take place of the epoxides with themselves. Whatever the theoretical explanation may be of the reactions which take place when the complex epoxides are compounded with the aldehyde condensates and caused to react therewith, valuable reaction products can be produced as a result of such reactions.

It may well be that various reactions take place simultaneously or successively in the process of reaction of the complex epoxides and aldehyde condensates to form the intermediate and final reaction products.

When a mixture of urea aldehyde condensates and melamine aldehyde condensates are used with the complex epoxides, and the reaction mixtures are heated to bring about reaction, it may be that certain reactions take place at a more rapid rate than others. But in any event the final reaction products, when made of proper proportions of the aldehyde condensates and complex epoxides, form valuable reaction products.

The reactivity of the different complex epoxides with urea aldehyde condensates or melamine aldehyde condensates or mixtures thereof or other aldehyde amine or amide condensates is somewhat dependent upon the type of structure and the equivalent weight of the epoxide composition. The equivalent weight, as used in referring to the complex epoxides, means the weight which is equivalent to one epoxide group, or the weight which is capable of entering into a reaction by direct addition with one hydroxyl group or one amine or amide hydrogen group. The method used for determining the epoxide content or equivalent weight of the composition per epoxide group was by heating one gram sample of the epoxide composition with an excess of pyridine containing pyridine hydrochloride (made by adding 16 cc. of concentrated hydrochloric acid per liter of pyridine) at the boiling point for 20 minutes and back titrating the excess pyridine hydrochloride with 0.1 N sodium hydroxide using phenolphthalein as indicator, and considering that 1 HCl is equivalent to one epoxide group.

Usually the complex epoxides of low equivalent weight to epoxide groups are more highly reactive with the aldehyde condensates than complex epoxides of lower equivalent weight to epoxide groups. In general, the complex epoxides advantageously contain more than one epoxide group per molecule and may advantageously contain an average of around one and one-half or two epoxide groups per molecule. The complex epoxides are in general resinous in character. They may in some cases be liquid products, but for many practical purposes the resinous polyepoxides are solid at ordinary temperatures. The complex epoxy resins are soluble, unless too highly polymerized, in solvents such as acetone, methyl ethyl ketone, diacetone alcohol, cyclohexanone, etc.; and some of the complex epoxides of low melting point and low degree of polymerization are soluble in toluene.

Catalysts which have been found particularly advantageous for bringing about the reaction of the complex epoxides with the aldehyde condensates are alkaline catalysts such as aliphatic amines, sodium and potassium hydroxide and alkali phenoxides. Certain of the Friedel-Crafts type catalysts are also catalytic for these reactions. Of such catalysts boron trifluoride has been found to be extremely active in promoting such reactions and in fact too active in a number of cases to be used as such. However, if a latent type catalyst which on the application of heat liberates boron trifluoride is used, the reaction may be controlled such that it gives a smooth conversion. The latent type of boron trifluoride catalysts referred to are usually coordinated compounds of boron trifluoride with amines, amides, sulfides and the like. Likewise, certain diazonium salts may be prepared which contain boron trifluoride in a form which is not active at ordinary temperatures but decompose at higher temperatures to give boron trifluoride which catalyzes the polymerization or reaction through epoxide groups.

The final conversion of the composition made with the complex epoxides and aldehyde condensates may be carried out with or without the use of solvents and with or without the use of plasticizers, depending on the final results desired.

In protective coating applications it is usually desirable to apply a product which is essentially a solid dissolved in a solvent, in which case it undergoes a preliminary dry by mere solvent evaporation, and the dry film may then be converted to an infusible, insoluble product on further heat treatment; and the compositions of the present invention are well adapted for this purpose.

On the other hand, when the compositions of the present invention are used to make molded objects, it is usually desirable to use a composition which contains no solvent, and in some cases a composition which may be used in a dry powdered form.

In still other applications, it is desirable to have a composition, containing no solvent, which is sufficiently liquid at a relatively low temperature to be used directly in the impregnation of wood and certain fabric materials.

It is generally recognized that the addition of plasticizers to impart flexibility to otherwise brittle products is undesirable in that the plasticizer adds nothing to the film strength while the plasticizer is often lost, especially from protective coatings by a leaching out process which takes place on ageing and which results in a final, brittle product. The improved compositions of the present invention enable urea aldehyde condensates or melamine aldehyde condensates or mixed condensates which usually give very brittle films or molded objects on conversion to be formed into final products which are sufficiently flexible and tough for use as protective coating materials and molded objects without the use of plasticizers, by proper formulation of the mixtures of the complex epoxides and the aldehyde condensates and converting the resulting composition into the final product.

The present invention provides a wide range of reaction compositions and products including initial mixtures of aldehyde condensates with complex epoxides, as well as partial or intermediate reaction products of such initial mixtures, and compositions containing such intermediate reaction products, as well as final reaction products and compositions.

The complex epoxides as described in the above mentioned copending applications, may be of widely varying chemical structures and they may also have widely varying physical properties, for example, they may be liquid materials, or they may be solids melting at relatively low temperatures or even at high temperatures.

Another modified form of the invention includes the use, in place of the complex epoxides previously formed, of mixture of the ingredients or reactants which go to make up the complex epoxides and the use of such mixtures with the aldehyde condensates. Mixtures of simple polyepoxides and polyhydric phenols on the application of heat give complex epoxides, as described in my prior application Serial No. 626,449 filed November 2, 1945. The conditions required for the reaction of complex epoxides with the urea aldehyde or melamine aldehyde condensates or mixtures thereof or other aldehyde amine or amide condensates is essentially the same for that required for the reaction of the simple polyepoxides with polyhydric phenols, and it is therefore possible to carry out all of these reactions simultaneously, although it is probable that other reactions take place, e. g., between the simple polyepoxides and the aldehyde condensates, as well as between the simple polyepoxides and polyhydric phenols to form complex epoxides which when formed react with the aldehyde condensates.

Thus, initial mixtures and compositions can be made containing a simple polyepoxide such as diepoxy butane, or diglycide ether, or the polyepoxide hereinafter referred to in Example II, together with a polyhydric phenol such as bisphenol, etc., and the aldehyde condensate such as a urea formaldehyde condensate or a melamine formaldehyde condensate, or mixtures thereof, or other aldehyde amine and aldehyde amide condensates, and such a mixture of simple polyepoxide, polyhydric phenol and aldehyde condensate, in proper proportions, forms a valuable initial composition which can be used in liquid form or in solution, and subsequent heating either without or with the addition of a catalyst, will bring about reaction between the simple epoxide, polyhydric phenol and the aldehyde condensate to form intermediate reaction products of a resinous character, or to form final reaction products. Such initial compositions containing simple epoxides, polyhydric phenols and aldehyde condensates can be used in much the same manner as initial compositions of complex epoxides and aldehyde condensates, as hereinbefore referred to. In general, when simple polyepoxides are used with polyhydric phenols and aldehyde condensates, a somewhat higher proportion of the simple polyepoxide is advantageously used than in making the complex epoxides separately by reacting the simple polyepoxides with polyhydric phenols.

In using the aldehyde condensates with simple polyepoxides and polyhydric phenols, a wide range of aldehyde amine and aldehyde amide condensates can be used, as with the use of such aldehyde condensates with previously formed complex epoxides. The aldehyde condensate may thus be one derived with the reaction of melamine with formaldehyde or by the reaction of urea with formaldehyde or from a mixture of urea and melamine with formaldehyde; or aldehyde condensates may be made by blending, e. g., urea formaldehyde condensates with melamine formaldehyde condensates. The urea as well as the melamine used in making such condensates may be substituted or unsubstituted, e. g., part of the hydrogen atoms may be replaced by say, an alkyl or aryl group.

The aldehyde condensates may be prepared, as previously described, in the presence of solvents such as alcohols which enter into the reaction to some extent, giving a somewhat modified structure to the final product; and such modified aldehyde condensates, such as urea formaldehyde resins made in the presence of butyl alcohol, or alkyl modified melamine formaldehyde resins, or melamine formaldehyde butylated resins, etc. may advantageously be used with the complex epoxides or with simple epoxides and polyhydric phenols in making the new compositions and reaction products.

The aldehydes used in preparing the aldehyde condensates with amines and amides include aldehydes which are reactive with amides and amines such as urea and melamine to give heat converting compositions when blended with the complex epoxides or when used with simple epoxides and polyhydric phenols. However, formaldehyde condensates such as urea formaldehyde resins and melamine formaldehyde resins and mixtures thereof are particularly advantageous for use in making the new compositions of the present invention.

Other modifying agents may also be used in making the new compositions. Thus, other modified agents may be present in the compositions which are used for conversion or as part of the urea formaldehyde condensate or melamine aldehyde condensate or as a part of the complex epoxide to be used in formulating and making the composition from which the final infusible products are to be produced. Thus, for example, the urea aldehyde condensates such as urea formaldehyde resins or the melamine aldehyde condensates such as melamine formaldehyde resins may be blended or reacted with other resins such as alkyd resins or phenol aldehyde resins, and such mixed products or reaction products are likewise useful in producing the new compositions of the present invention and particularly modified compositions.

It is also sometimes advantageous to mix the compositions containing the aldehyde condensates, such as urea formaldehyde condensates or melamine formaldehyde condensates and the complex epoxides with various other resins in order to obtain modified properties or certain specific desired properties in the final converted products.

The compositions of the present invention may be used without or with fillers and extenders of the inert type. For example, valuable enamels may be obtained by pigmenting the initial or intermediate compositions with the usual type of inert pigments used in the formulation of enamels and paints. It is also sometimes desirable to use such inert materials as wood flour or asbestos with the new compositions in the preparation of certain molded objects. For example, brake linings and clutch linings may be formulated from mixtures of asbestos type materials with the new compositions.

For certain applications such as the manufacture of certain resin bonded grinding wheels it is desirable to introduce abrasive materials and other fillers into the compositions in which the resinous composition acts as a bonding material for the fillers and abrasives when the compositions are subjected to final hardening.

In addition to having outstanding physical properties such as toughness and flexibility the final conversion products produced from the new compositions have outstanding chemical properties. Such products are highly resistant to oxidation, water, alkali, acids, solvents, etc.

Films and objects made from the new compositions are also relatively free from yellowing on ageing, apparently due to the fact that there are present none of the chemical groups which are sensitive to the action of air and moisture in the presence of light which in the case of so many of the protective coating materials known in the art form color groups.

It has also been observed that films prepared from the new compositions have unusually high adhesion for surfaces, particularly when non-basic or small amounts of basic catalysts are used. This is especially desirable in such application as protective coating films and even with certain molded objects such as the mold used to cement the bristles of an ordinary paint brush into the metal ferrule. This unusual adhesion to surfaces is apparently due to the fact that the compositions contain a high percentage of polar groups, such as unreacted alcohol hydroxyl groups, ether groups, amide and amine groups. Even though the new compositions of the present invention do contain a high percentage of these polar groups in the final converted products, the tolerance for water is unusually low, apparently due to the high molecular weight and rigid structure of the final material.

The invention will be further illustrated by the following specific examples, but it will be understood that the invention is not limited thereto. The examples relating to the new compositions are Examples VII to XVII. Examples I to VI illustrate the production of initial products for use in making the new compositions. In the examples the parts given are by weight.

Example I illustrates the production of a water soluble urea formaldehyde resin or condensate, but it will be understood that urea formaldehyde condensates or resins are well known in the art and generally available, the particular condensate of Example I being given merely as an illustration.

*Example I*

A water soluble urea formaldehyde condensate was prepared as follows: a mixture of 240 parts of urea, 520 parts of formalin (40% formaldehyde), 20 parts of concentrated ammonium hydroxide, and .8 part of sodium carbonate was refluxed for 2 hours, to give a syrupy product which contained 53½% solids by weight.

Example II illustrates the preparation of a simple polyepoxide from glycerol and epichlorhydrin which is an advantageous polyepoxide for use with polyhydric phenols and aldehyde condensates, such as urea formaldehyde condensates or melamine formaldehyde condensates, etc.

*Example II*

In a reaction vessel provided with a mechanical stirrer and external cooling means was placed 276 parts (3 mols) of glycerol and 828 parts (9 mols) of epichlorhydrin. To this reaction mixture was added 1 part of 45% boron trifluoride ether solution diluted with 9 parts of ether. The reaction mixture was agitated continuously, the temperature rose to 50° C. over a period of 1 hour and 44 minutes, at which time external cooling with ice water was applied. The temperature was held between 49° C. and 77° C. for 1 hour and 21 minutes.

To 370 parts of this product in a reaction vessel provided with a mechanical agitator and a reflux condenser was added 900 parts of dioxane and 300 parts of powdered sodium aluminate. With continuous agitation, the reaction mixture was gradually heated to 93° C. over a period of 1 hour and 51 minutes, and held at this temperature for 8 hours and 49 minutes. After cooling to room temperature the inorganic material was removed by filtration. The dioxane and low boiling products were removed by heating the filtrate to 205° C. at 20 mm. pressure to give 261 parts of a pale yellow product.

Examples III, IV and V illustrate the production of complex epoxides, but these examples are given merely by way of illustration, such complex epoxides being more fully described in my prior applications hereinbefore referred to.

*Example III*

A mixture of 7 mols of bis-phenol and 9 mols of epichlorohydrin were reacted with the addition of caustic soda solution containing 11 mols of sodium hydroxide to give a complex epoxide softening at 100° C., and having an equivalent weight to epoxide of 600.

*Example IV*

A complex epoxide was prepared by the reaction of 3.5 mols of bis-phenol with 7 mols of epichlorohydrin in the presence of aqueous caustic solution containing 7.5 mols of sodium hydroxide. The product had a softening point of 43° C. and equivalent weight to epoxide of 325.

*Example V*

A complex epoxide was likewise prepared by the reaction of 3 mols of resorcinol with 3.5 mols of epichlorohydrin in the presence of aqueous caustic solution containing 3.6 mols of sodium hydroxide. This product melted at 80° C. and had an equivalent weight to epoxide of 900.

Example VI illustrates the production of a composition made by mixing or blending a polyhydric phenol with a simple polyepoxide to form a mixture suitable for use with the aldehyde condensates.

*Example VI*

A mixture of 324 parts of the product of Example II and 152 parts of bis-phenol was made by warming with agitation until a complete solution was obtained. This product is essentially a solution of bis-phenol in the liquid polyepoxide. The product is a viscous liquid having a viscosity of $Z_1$ as determined by the bubble viscosimeter.

Examples VII to XVII illustrate the new compositions and products of the present invention.

*Example VII*

100 parts of the product of Example III dissolved in an equal weight of methyl isobutyl ketone was treated with .2 of a part of sodium phenoxide. To this product was added 200 parts of the product of Example I and the resulting mixture was heated until all of the water had been removed by distillation.

Thin films of .003 inch thickness of this product when baked for ½ hour at 150° C. gave hard, flexible products.

*Example VIII*

Likewise, the product of Example V was used instead of the product of Example III as in Example VII to give a product which gave very hard flexible films when baked for ½ hour at 150° C.

*Example IX*

A mixture of 100 parts of the product of Example IV and 100 parts of a urea formaldehyde resin made in the presence of butyl alcohol and 5 parts of diethylene triamine, when spread in thin films of .003 inch thickness and baked for ½ hour at 150° C. gave hard, tough products.

*Example X*

A mixture of 100 parts of the complex epoxide from Example V and 100 parts of the 50% solution of a urea formaldehyde resin made from butanol, and 5 parts of diethylene triamine, gave a product which when spread in thin films and baked for ½ hour at 150° C. gave hard flexible products.

*Example XI*

300 parts of the product of Example VI and 200 parts of a urea formaldehyde resin made in the presence of butyl alcohol, was treated with 15 parts of diethylene triamine to give a product which likewise converted into infusible, flexible films when baked at 150° C.

*Example XII*

18 parts of the product of Example III and 4 parts of an alkyd modified melamine formaldehyde resin, 50% solids were treated with .9 part of diethylene triamine to give a mixture which when baked in thin films gave hard flexible products.

*Example XIII*

A mixture of 100 parts of the product of Example III, and 100 parts of a melamine formaldehyde butylated resin, 50% solids was treated with 5 parts of sodium phenoxide to give a composition which when spread in thin films of .003 inch thickness and baked for 15 minutes at 200° C. gave hard, infusible products.

*Example XIV*

18 parts of the product of Example III and 2 parts of a melamine formaldehyde butylated resin were treated with .9 part of sodium phenoxide to give a product which when baked for ½ hour at 200° C. in either thin or thick films, gave hard, tough, infusible products.

Similar products were obtained when the sodium phenoxide catalyst was replaced by an equal weight of diethylene triamine.

*Example XV*

A mixture of 100 parts of the product of Example IV and 100 parts of a urea modified melamine formaldehyde butanol resin, was treated with 5 parts of diethylene triamine to give a product which can be baked in thin or thick layers for ½ hour at 150° C. to give hard, flexible products.

*Example XVI*

A mixture of 300 parts of the product of Example VI and 200 parts of a 50% solution of a urea modified melamine formaldehyde butanol resin was treated with 15 parts of monopotassium bis-phenoxide to give a composition which when baked in either thin or thick layers for ½ hour at 150° C. gave hard, flexible products.

*Example XVII*

This example illustrates the preparation ana use of a thiourea condensate with a complex polyepoxide.

A mixture of 520 parts (6 mols) of formalin, .8 part of sodium carbonate, 20 parts of concentrated ammonium hydroxide, and 304 parts (6 mols) of thiourea was refluxed for ½ hour to give a syrupy product containing 60% solids.

To 10 parts of this syrup was added 90 parts of the product of Example III, dissolved in ethylene glycol monomethyl ether acetate (60% solids), and the resulting mixture heated and stirred until all of the water was driven off. To this product was added 1.5 parts of sodium hydroxide to give a product which when spread in thin films of .003 inch thickness and baked 1 and ½ hours at 150° C. gave a hard flexible infusible product.

In the above examples the proportions of complex epoxide and of aldehyde amine or aldehyde amide resin vary from approximately equal proportions by weight to around 9 parts of complex epoxide to 1 of aldehyde amine or amide resin.

The compositions of Examples VII to XVII, inclusive, may be converted in layers of any thickness. For molded objects or very thick layers, it is necessary to remove most of the solvent before the temperature is raised to that required for conversion.

It will thus be seen that the present invention provides improved resinous and plastic compositions and products in which aldehyde amine and aldehyde amide compositions are admixed with complex epoxides or with simple epoxides and polyhydric phenols to form initial compositions capable of conversion into intermediate or into final reaction or polymerization products.

It will also be seen that initial compositions may be used directly in making liquid coating compositions or in making molded articles, etc. with subsequent conversion by heating into the final reaction product.

It will further be seen that intermediate reaction products can be produced which are soluble and fusible and which are capable of other reaction to form final infusible products.

Products and compositions of varying properties can be produced by using varying proportions of the aldehyde condensate or resin and of the complex epoxide as well as by using resins of somewhat different properties. With high melting aldehyde condensates or high melting complex polyepoxides a limited amount of reaction may be sufficient to convert the mixed products into a final infusible product. With aldehyde condensates or resins of an intermediate stage of condensation and with complex epoxides also of an intermediate character the reaction can be carried out in stages to form intermediate plastic compositions which can be subsequently converted into final products.

The new compositions are capable of admixture with various other resins in forming the final molding mixtures and can also be used for compounding with fillers in making molded articles or for impregnating paper, fabric, wood, etc. in making impregnated or coated or laminated articles.

The term "organic ammonia derivative" as used in the appended claims is defined as organic amines or organic amides containing active hydrogen attached to a nitrogen atom.

I claim:

1. The method of producing a complex reaction product which comprises heating substantial amounts of a fusible resinous condensate of an aldehyde with an organic ammonia derivative containing reactive hydrogen and selected from the class which consists of amines and amides with a complex epoxide which is a polyether derivative of a polyhydric phenol containing epoxide groups and free from functional groups other than epoxide and hydroxyl groups, the proportions being within the range of from about equal proportions by weight of complex epoxide and aldehyde condensate to about 9 parts of complex epoxide to 1 of aldehyde condensate.

2. The process according to claim 1 in which the reaction is carried out in the presence of a catalyst selected from the group which consists of aliphatic amines, alkali metal hydroxides, alkali phenoxides and boron trifluoride catalysts.

3. The process according to claim 1 in which the reaction is carried out by heating to a baking temperature.

4. The process according to claim 1 in which the aldehyde condensate is a urea formaldehyde condensate.

5. The process according to claim 1 in which the aldehyde condensate is a butylated urea formaldehyde resin.

6. The process according to claim 1 in which the aldehyde condensate is a melamine formaldehyde resin.

7. A composition containing substantial proportions of a fusible condensate of an aldehyde with an organic ammonia derivative selected from the group which consists of amines and amides and containing reactive hydrogen and a complex epoxide which is a polyether derivative of a polyhydric phenol containing epoxide groups and free from functional groups other than epoxide and hydroxyl groups, the proportions being within the range of from about equal proportions by weight of complex epoxide and aldehyde condensate to about 9 parts of complex epoxide to 1 of aldehyde condensate.

8. A composition as defined in claim 7 which also contains a catalyst selected from the group which consists of aliphatic amines, alkali metal hydroxides, alkali phenoxides and boron trifluoride catalysts.

9. An intermediate reaction product of the composition of claim 7 capable of further reaction to form an infusible product.

10. An intermediate reaction product of the composition of claim 8 capable of further reaction to form an infusible product.

11. A composition containing in substantial proportions a fusible urea formaldehyde resin containing active hydrogen and a complex epoxide which is a polyether derivative of a polyhydric phenol containing epoxide groups and free from functional groups other than epoxide and hydroxyl groups, the proportions of complex epoxide and of urea formaldehyde resin varying from about equal parts by weight to about 9 parts of complex epoxide to 1 of urea formaldehyde resin.

12. A composition containing in substantial proportions a fusible butylated urea formaldehyde resin containing active hydrogen and a complex resinous epoxide which is a polymeric polyether derivative of a polyhydric phenol containing epoxide groups and free from functional groups other than epoxide and hydroxyl groups, in proportions varying from about equal parts by weight of complex epoxide and butylated urea formaldehyde resin to about 9 parts of epoxide to 1 of butylated formaldehyde resin.

13. A composition containing in substantial proportions a fusible melamine formaldehyde resin containing active hydrogen, and a complex resinous epoxide which is a polymeric polyether derivative of a polyhydric phenol containing epoxide groups and free from functional groups other than epoxide and hydroxyl groups, in proportions between about equal parts by weight of epoxide and melamine formaldehyde resin to about 9 parts of epoxide to 1 of melamine formaldehyde resin.

14. A composition as defined in claim 11 which also contains a catalyst selected from the group which consists of aliphatic amines, alkali metal hydroxides, alkali phenoxides and boron trifluoride catalysts.

15. A composition as defined in claim 12 which also contains a catalyst selected from the group which consists of aliphatic amines, alkali metal hydroxides, alkali phenoxides and boron trifluoride catalysts.

16. A composition as defined in claim 13 which also contains a catalyst selected from the group which consists of aliphatic amines, alkali metal hydroxides, alkali phenoxides, and boro trifluoride catalysts.

17. The method of producing a complex reaction product which comprises heating together a mixture containing substantial amounts of a polyepoxide free from functional groups other than epoxide and hydroxyl groups, a polyhydric phenol free from functional groups other than phenolic hydroxyl groups and a fusible condensate of an aldehyde with an organic ammonia derivative selected from the group which consists of amines and amides and containing reactive hydrogen.

18. A composition in the form of a mixture containing substantial proportions of a polyepoxide free from functional groups other than epoxide and hydroxyl groups, a polyhydric phenol free from functional groups other than phenolic hydroxyl groups and a condensate of an aldehyde with an ammonia derivative selected from the group which consists of amines and amides and containing reactive hydrogen.

19. A composition as defined in claim 18 in which the aldehyde condensate is a urea formaldehyde condensate.

20. A composition as defined in claim 18 in which the aldehyde condensate is a butylated urea formaldehyde condensate.

21. A composition as defined in claim 18 in which the aldehyde condensate is a melamine formaldehyde condensate.

SYLVAN OWEN GREENLEE.

REFERENCES CITED

The following references are of record in the file of this patent:

UNITED STATES PATENTS

| Number | Name | Date |
|---|---|---|
| 2,076,624 | DeGroote | Apr. 13, 1937 |
| 2,136,928 | Schlack | Nov. 15, 1938 |
| 2,213,477 | Steindorff et al. | Sept. 3, 1940 |